(12) United States Patent
Srinivasan et al.

(10) Patent No.: US 7,730,284 B2
(45) Date of Patent: Jun. 1, 2010

(54) PIPELINED INSTRUCTION PROCESSOR WITH DATA BYPASSING AND DISABLING CIRCUIT

(75) Inventors: Balakrishnan Srinivasan, Eindhoven (NL); Ramanathan Sethuraman, Eindhoven (NL); Carlos Antonio Alba Pinto, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 805 days.

(21) Appl. No.: 10/549,368

(22) PCT Filed: Mar. 17, 2004

(86) PCT No.: PCT/IB2004/050270

§ 371 (c)(1),
(2), (4) Date: Sep. 14, 2005

(87) PCT Pub. No.: WO2004/084065

PCT Pub. Date: Sep. 30, 2004

(65) Prior Publication Data

US 2006/0212686 A1    Sep. 21, 2006

(30) Foreign Application Priority Data

Mar. 19, 2003 (EP) ................... 031007107

(51) Int. Cl.
G06F 9/30 (2006.01)

(52) U.S. Cl. .................................... 712/218

(58) Field of Classification Search ............... 712/220, 712/218
See application file for complete search history.

(56) References Cited

U.S. PATENT DOCUMENTS

| 5,805,852 | A | 9/1998 | Nakanishi | |
|---|---|---|---|---|
| 6,035,388 | A | * | 3/2000 | Choquette et al. ........... 712/215 |
| 6,145,074 | A | | 11/2000 | Asato et al. |
| 6,175,910 | B1 | | 1/2001 | Pauporte et al. |
| 6,594,753 | B2 | * | 7/2003 | Choquette et al. ........... 712/214 |
| 6,624,818 | B1 | * | 9/2003 | Mantor et al. ............... 345/522 |
| 6,839,831 | B2 | * | 1/2005 | Balmer et al. ............... 712/218 |
| 2002/0004916 | A1 | | 1/2002 | Marchand et al. |
| 2002/0108026 | A1 | * | 8/2002 | Balmer et al. ............... 712/218 |
| 2002/0199084 | A1 | * | 12/2002 | Choquette et al. ........... 712/215 |
| 2003/0212915 | A1 | | 11/2003 | Luick |
| 2004/0148494 | A1 | * | 7/2004 | Civlin ........................ 712/218 |

FOREIGN PATENT DOCUMENTS

| EP | 1050801 | A1 | 11/2000 |
|---|---|---|---|
| EP | 1199629 | A | 4/2002 |
| JP | 10003389 | | 6/1998 |
| WO | 0161478 | A | 8/2001 |
| WO | WO 2007057831 | A1 * | 5/2007 |

OTHER PUBLICATIONS

Clock Gating by Mukherjee.*
Frank Emnett and Mark Biegel, Power REduction Through RTL Clock Gating, SNUG San Jose 2000, pp. 3-6.*
Hennessy and Patterson, Computer Organization and Design, 1998, Morgan Kaufmann Publishers, p. 499.*
Karl-Filip Faxen; "Back End Issues for Modern Microprocessors: The State of the Art", Jun. 18, 1997, Internet Publication.

* cited by examiner

Primary Examiner—Aimee J Li

(57) ABSTRACT

An instruction processing device has a of pipe-line stage with a functional unit for executing a command from an instruction. A first register unit is coupled to the functional unit for storing a result of execution of the command when the command has reached a first one of the pipeline stages, and for supplying bypass operand data to the functional unit. A register file is coupled to the functional unit for storing the result when the command has reached a second one of the pipeline stages, downstream from the first one of the pipeline stages, and for supplying operand data to the functional unit. A disable circuit is coupled to selectively disable storing of the results in the register file under control of the instructions.

12 Claims, 4 Drawing Sheets

PIPELINED INSTRUCTION PROCESSOR WITH DATA BYPASSING AND DISABLING CIRCUIT

Figure 1:
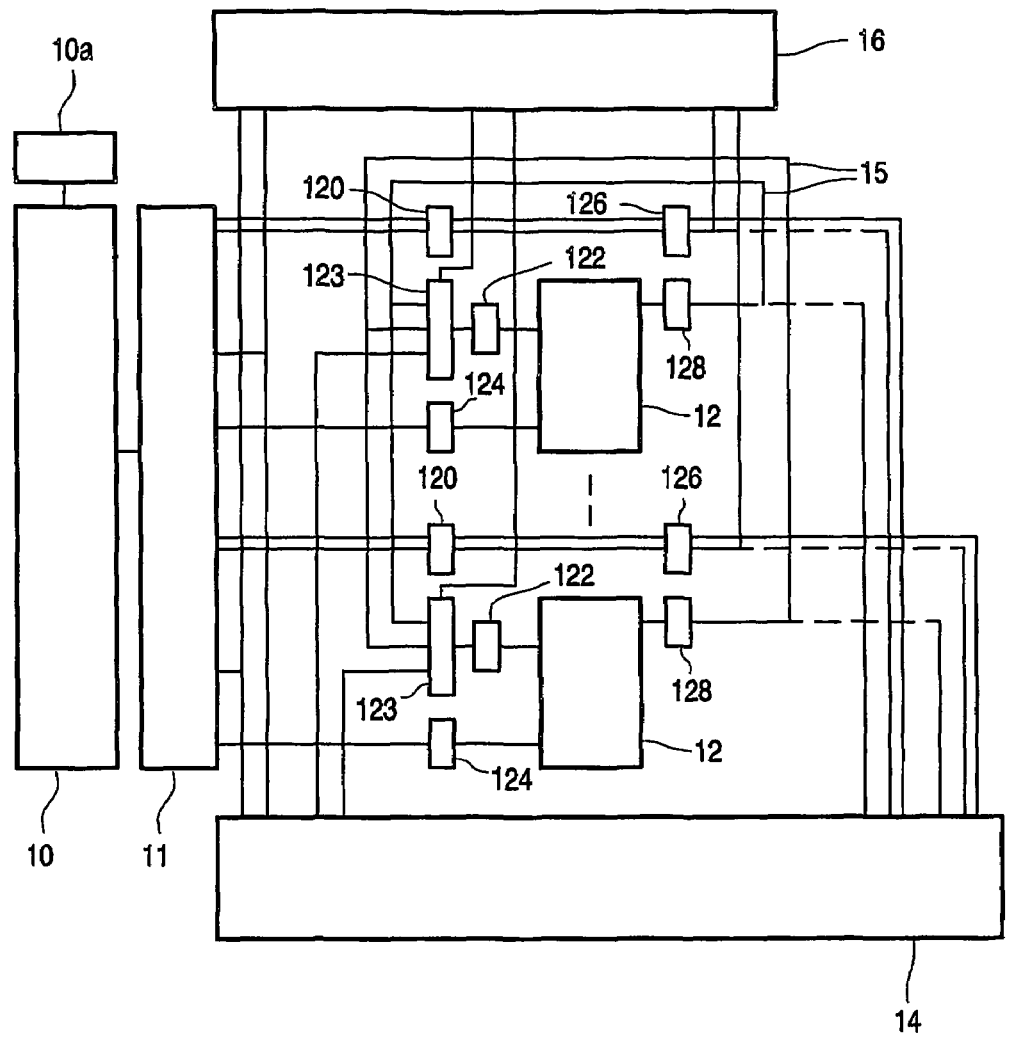

The invention relates to an instruction processing device with a pipelined functional unit.

Data dependency imposes significant restrictions on the throughput of instruction processors. Instruction processors execute successive operations that require input operands and produce results. Operands are generally stored in a register file, from which they are retrieved using operand addresses from a command in an instruction. The result is stored in the register file using a result address of the command. When its operands are retrieved from the register file the command cannot be executed until the operands have been stored in the register file by preceding instructions. Thus a minimum delay between the commands is needed. This reduces efficiency of the processor. In VLIW processors, for example, no-operations may have to be scheduled for functional units in some instruction cycles because insufficient operands are available.

U.S. Pat. No. 5,805,852 describes how a VLIW processor can be made more efficient by means of a bypass between a pipeline stage of a functional unit in which results are produced and a pipeline stage wherein operands are used. The bypass makes the result available as operand for a subsequent instruction without the delay necessary for storing the result in the register file and retrieving it as an operand from the register file.

During pipelined operation, a functional unit first generates the result in an execution stage of a pipeline, and stores the result in a pipeline register behind the execution stage. Subsequently the functional unit hands on the result through the pipeline until it has been stored in the register file. When a new command enters the pipeline of one of the functional units, its operand addresses are compared with the addresses of results that are still in the pipelines of respective ones of the functional units. When a match occurs the operand is taken from the pipeline stage of the relevant functional unit rather than from the register file.

In recent years the size of register files has tended to increase. Large register files have the advantage that they speed up execution because it is less frequently necessary to wait until a register is available for reuse or to spill operands to memory. The price of the larger register files has been an increase in power consumption. The register file now often is the major power consumer in a VLIW processor.

Amongst others, it is an object of the invention to reduce the power consumption due to register files in an instruction processing device.

The instruction processing device according to the invention is set forth in Claim 1. The invention is based on the observation that power can be saved by not writing results to a register file when they do not need to be retrieved from the register file, because they are used only via a bypass path. Prior to execution of instructions, for example during compilations of the instructions, it can be determined whether it can be guaranteed that a result of an operation will be not used other than via a bypass. If so, bypassing of the result suffices and it is not necessary to store the result in the register file. By disabling storage into the register file in this case, power consumption is reduced.

In an embodiment the instruction processing device contains a plurality of bypass registers that are selectively addressable with a register address from the command, for selecting a register for storing the result and/or for retrieving operand data. Thus, it is made possible to avoid writing to the register file more often. Typically there are far fewer bypass registers than registers in the register file, so as not to slow down the instruction cycle duration. The result is written to a bypass register at a pipeline stage before it is written to the register file.

In an embodiment writing of the result is disabled by suppressing a supply of clock signals to circuitry for writing the result into the register file. When the register file has a number of write ports writing is disabled at selected write ports, selected under control of the instructions.

Preferably, bypassing is controlled by a bypass control unit that compares result register addresses from the commands with operand register address of later commands causing substitution of a result from a bypass path in case of a match of the addresses. Thus, no special addresses are needed for bypassed results. In another embodiment the instructions contain addresses to select between different bypass registers.

In an embodiment a chain of registers is provided for supplying bypass operand data. Results shift through bypass registers in the chain in successive instruction cycles. The chain extends further than necessary for writing the result into the second register unit. The makes it possible more often to avoid power consumption for writing results to the register file. Bypass data from the registers in the chain may be selected by comparing operand addresses with result register addresses, or using explicit register selection information from the instructions. The latter simplifies bypassing control circuitry.

The invention is advantageously applied to processors such as VLIW processors, which contain a plurality of functional units that operate in parallel. Such processors require increasingly larger register files since more functional units operate in parallel. By suppressing writing to the register files considerable power consumption is saved. Preferably groups of bypass registers are provided, each for storing results from a respective one of the functional units only, the registers of all groups being addressable from each command for retrieving operands.

The invention also relates to a method of compiling programs, in which the conditions for suppressing writing to the register file are detected, after which information is added to the instructions to suppress such writing. Detection involves testing whether results of instructions can be passed via a bypass path (this is mainly a matter of being used sufficiently soon after production) and whether it can be guaranteed that these results will not be used later (e.g. by scanning the instructions to detect whether the result is not used again in any later reachable instruction before the register that contains the result is overwritten or before the end of the program). A computer program for executing such a method may be passed on any computer program product, such as a magnetic or optical disc, a semi-conductor memory module, a download signal etc.

These and other objects and advantageous aspects of the invention will be described using the following figures.

Figure 2:
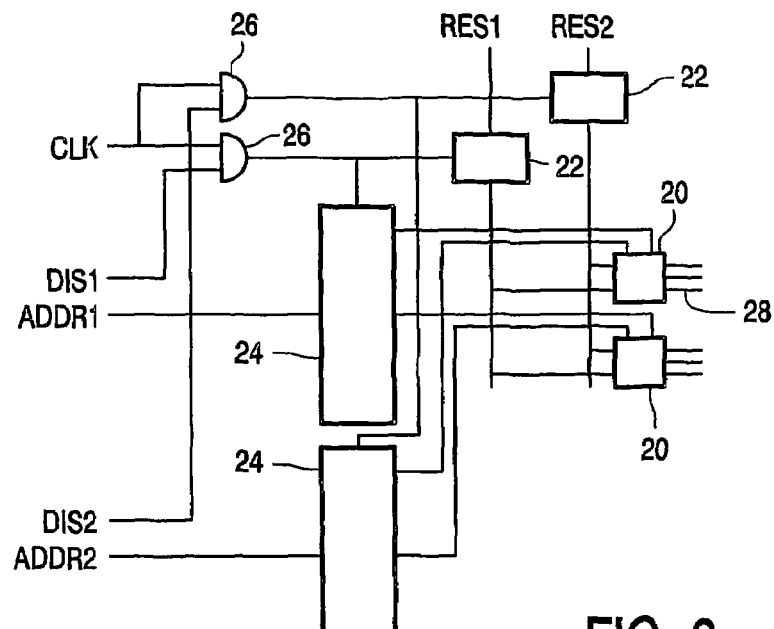
Figure 3:
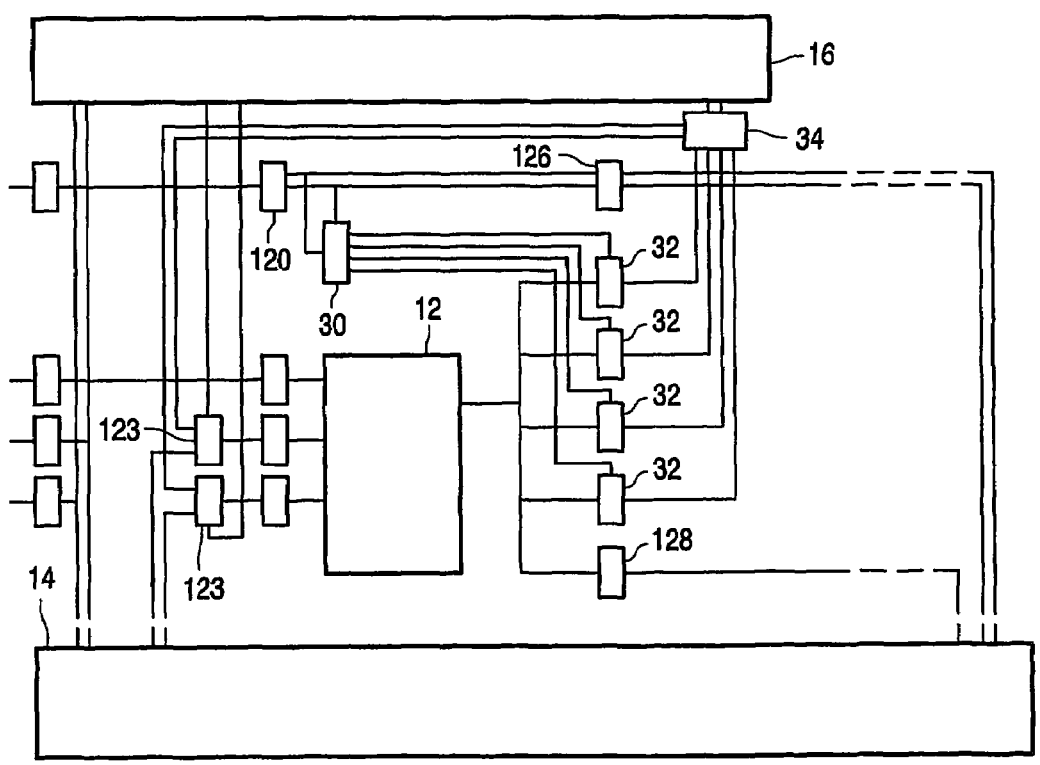
Figure 4:
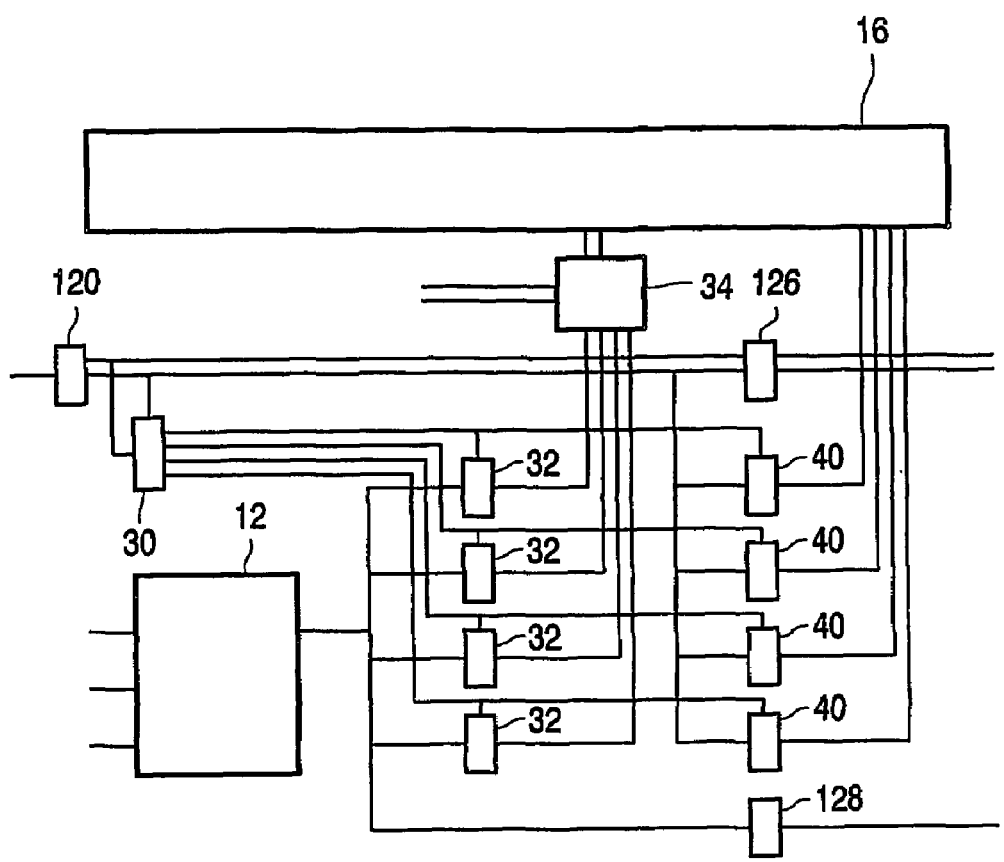
Figure 5:
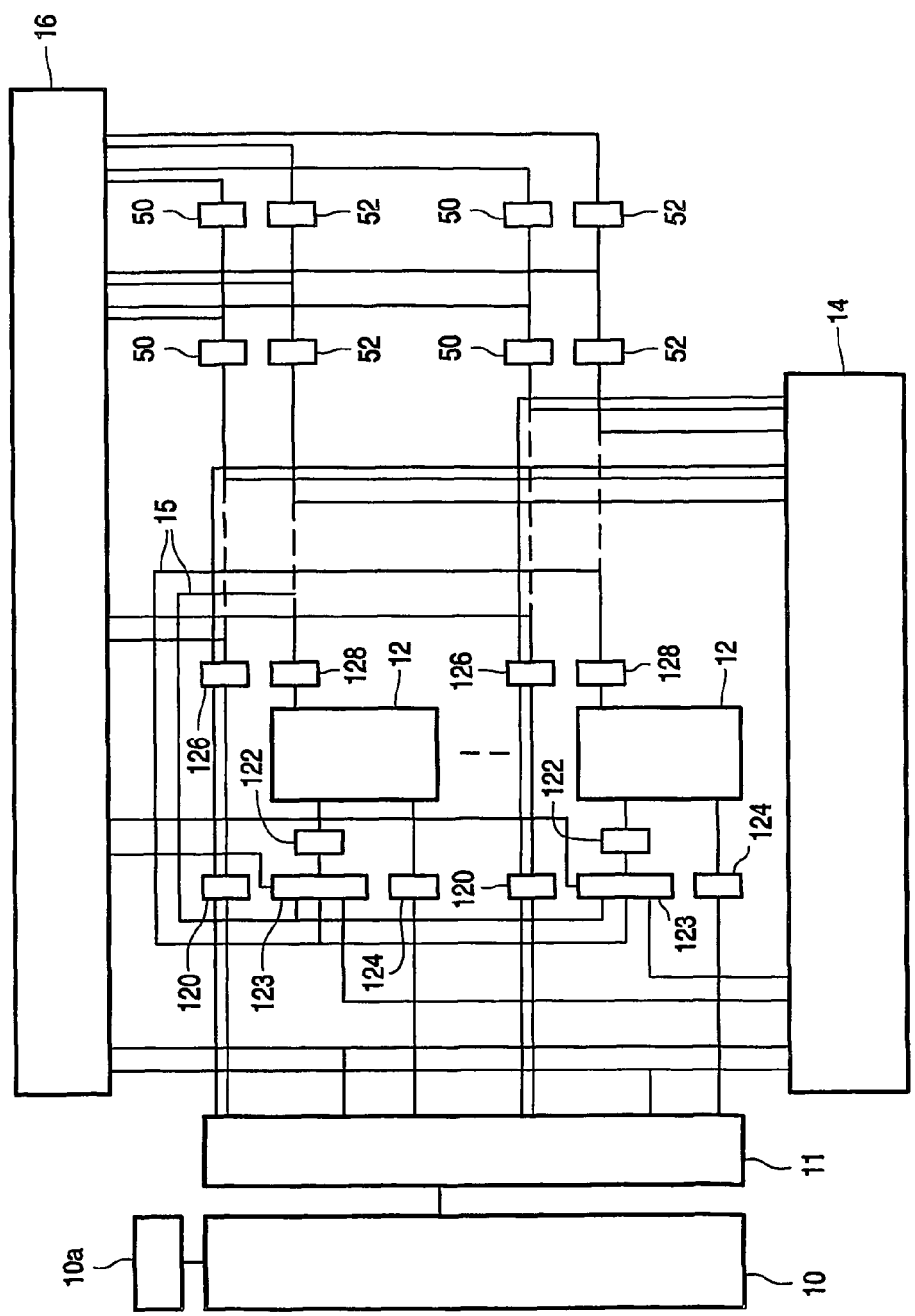

FIG. 1 shows a pipelined processor
FIG. 2 shows part of a register file
FIG. 3 shows part of a pipelined processor
FIG. 4 shows part of a further pipelined processor
FIG. 5 shows part of a further pipelined processor FIG. 1 shows an example of a simplified pipelined VLIW processor. The processor contains an instruction memory 10, a program counter 10a, an instruction register 11, execution units 12, a register file 14 and a bypass control unit 16. By way of example, two execution units 12 are shown in parallel, but in practice more execution units may be used. Each execution unit may contain a group of functional units (not shown), or be a functional unit by itself. Instruction register 11 has outputs for a plurality of commands from an instruction, each command for a respective one of execution units 12. Each command contains a part for an opcode, a part for operand register addresses and a part for a result register address. The outputs of instruction register 11 for the operand register address parts of the commands are coupled to read ports of register file 14 and to operand register address inputs of bypass control unit 16. Usually, each command contains two operand addresses, but for the sake of clarity connections for only one operand (address) are shown. More than two operands are also possible for operations such as the multiply-accumulate.

The processor is divided into successive pipeline stages, which are separated by means of pipeline registers. For each execution unit 12 the processor contains first stage pipeline registers 120, 122, 124 and a multiplexer 123 between instruction register 11 and the execution unit 12. A first one of the first stage pipeline registers 124 stores the opcode part of the command for the execution unit 12. A second one of the first stage pipeline registers 122 stores operands of the command for the execution unit 12. A third one of the first stage pipeline register 120 stores the result address of the command for the execution unit 12 and write control information. The first one of the first stage pipeline registers 124 has an input coupled to the outputs of instruction register 11 for the opcode part of the command for the execution unit 12. The third one of the first stage pipeline registers 120 has an input coupled to the outputs of instruction register 11 for the result address part of the command for the execution unit 12.

The second one of the first stage pipeline registers 122 has an input coupled, via multiplexer 123, to the read port of register file 14 to which the operand address parts of the command for the execution unit 12 are supplied. In principle, there will be a respective multiplexer 123 and a respective second one of the first stage pipeline registers 122 with similar connections for each of respective one of the operands of the command for the execution unit, but for the sake of clarity only one multiplexer 123 and second one of the first stage pipeline registers 122 is shown.

Second stage pipeline registers 126, 128 are included behind execution units 12. A first one of the second stage pipeline registers 126 is coupled to the third one of the first stage pipeline registers 124, for receiving the result register address parts of commands and the write control information. A second one of the second stage pipeline registers 128 is coupled to a result output of execution unit 12. The first and second ones of the second stage pipeline registers 126, 128 are coupled to write ports of register file 14, for supplying results and corresponding result register addresses, as well as the write control information.

Multiplexers 123 each have an input coupled for receiving an addressed operand from the read ports of register file 14, and for receiving bypass operands from the second ones of the second stage bypass registers 128 via bypass paths 15. The third one of the first stage registers 124 and the first one of the second stage registers 126 pass operand register addresses and result addresses to bypass control unit 16 respectively. Bypass control unit 16 controls multiplexers 123 to determine which of their inputs is coupled to the second one of the first stage pipeline registers 122.

In operation program counter 10a supplies a series of instruction addresses to instruction memory 10. In response to each instruction address instruction memory supplies a respective instruction to instruction register 11. Each instruction contains commands for a plurality of execution units 12. The commands may contain operand register addresses of the operand or operands of the command. The operand register addresses are supplied to read ports of register file 14. In response register file 14 supplies the addressed operands from the read ports. Normally, the operands are supplied to the relevant execution units 12 with the (optionally decoded) opcode part of the corresponding command. The execution units 12 execute the commands using the operand and produce a result. For an "ADD" command for example, two operands are used and their sum is produced as a result. The result is supplied to a write port of register file 14, together with a result register address from the command.

Command execution is pipelined. This means that a new instruction starts in substantially every instruction cycle and that successive steps of execution of an instruction are executed in successive instruction cycles. For example in a first instruction cycle the instruction memory are addressed, in a second instruction cycle the operands are fetched, in a third instruction cycle the command is executed proper by the execution unit 12 and in a subsequent instruction cycle the result is written to register file 14. Thus, execution of an instruction takes a number of instruction cycles. The respective parts of the processor that execute the instruction in respective successive instruction cycles are called pipeline stages. In a particular instruction cycle the different pipeline stages process different instructions in different stages of execution. The different pipeline stages are separated by pipeline registers to separate the information of the different instructions under process. Instruction cycles are indicated by a clock (not shown) which control takeover of information from a preceding pipeline stage into the pipeline register at the end of each instruction cycle.

Pipelined processors are known per se. It will be appreciated that the figure shows only one simple embodiment. Without deviating from the invention many alternative pipelined architectures may be used, in which different tasks are distributed differently over different pipeline stages and that additional pipeline stages may be added.

Bypass paths 15 serve to reduce the need to wait with execution of an instruction until its operands have been stored in register file 14. If a first instruction produces a result that is used as operand by a second instruction, the result can be passed to execution unit 12 via bypass paths 15 before the result has been written to register file 14. Bypass control unit 16 compares the operand register address of the second instruction with the result register address of the first instruction. When a match occurs bypass control unit 16 controls multiplexer 123 to pass the result from pipeline register 122 instead of a result from register file 14. This makes it possible to execute the second instruction sooner.

Bypassing itself is known per se. It should be appreciated that many forms of bypassing exist and that the form shown in FIG. 1 is but one example, to which the invention is not limited. For example, the results used for the bypass may come from different pipeline stages than the one shown (e.g. directly from execution unit 12 to first stage pipeline register 122, or from a later stage (not shown)), or from more than one pipeline stage. Correspondingly, result register addresses may come from different stages than the one shown. Such addresses or comparison results may be stored in bypass control unit 16 to pipeline comparison as well. In addition a code may be present in the instructions to indicate whether bypassing should be used or not. This makes it possible to avoid bypassing when an instruction should use an "old" value from register file 14.

According to the invention write back of the result to register file 14 can be disabled under control of the instructions. This will be done when the result is used only via the bypass path 15 and not from register file 14. During compilation of a program of instructions a guaranteed last instruction of the program is determined that uses a result for each execution path that can be followed (if applicable via branch instructions). It will be appreciated that some execution paths may in fact never be reached during execution, but if this cannot be proven at compile time for some path, the last instructions that uses the result if that path is followed should be determined. If any last instruction that has been determined is scheduled to be executed so shortly after the instruction that produces the result that it can receive the result via bypassing, the compiler adds disable information to the instruction that produces the result. This indicates that the instruction need not be stored in register file 14. The disable information is passed down the pipeline with the result register address to register file 14 to disable storage of the result in register file 14.

FIG. 2 shows an example of a multiport register file with multiport registers 20 that have plural read ports 28. Data supply circuits 22 and addressing circuits 24 are coupled to multiport registers 20 for supplying result data and register selection signals respectively. Data supply circuits 22 have inputs RES1, RES2 for results. Addressing circuits 24 have inputs ADDR1, ADDR2 for result register addresses. Clock enable circuits 26 are coupled between a clock input CLK and clock terminals of data supply circuits 22 and addressing circuits 24. Clock enable circuits 26 are used to disable supply of clock signals to data supply circuits 22 and addressing circuits 24 under control of disable inputs DIS1, DIS2.

In operation clock pulses from clock enable circuits 26 cause data supply circuits 22 and addressing circuits 24 to drive supply of new data and selection signals to multiport registers 20. Information from the instructions is supplied to disable inputs DIS1, DIS2 for selectively disabling supply of clock signals for using data and addresses from those ports RES1, ADDR1, RES2, ADDR2 from which results are supplied for which it has been determined that no further use will be made of the results in the program. As a result power consumption by the data supply circuits 22 and addressing circuits 24 is reduced.

It will be appreciated that multiport register files are known per se. Many alternative architectures may be used without deviating from the invention. According to the invention the register file is arranged to disable selected parts of the register file. Instead of disabling both data supply circuits 22, and addressing circuits only one of these circuits may be disabled and/or any other circuit that consumes power when driven to update register content.

FIG. 1 shows that the disable information for a result is passed along with the result register address of a command, e.g. in the form of an additional bit from the command. This requires a minimal amount of modification of the processor to disable writing of the result. However, it will be appreciated that many alternative solutions exist for indicating selective disabling. For example, the information may be contained at the level of the instruction rather than at the level of individual commands, by encoding for example the position of one or more commands in the instruction for which disabling is allowed. In fact, the disable information need not even be contained in the same instruction as the relevant command. Instead it may be contained in an earlier or later instruction that is known to be executed at a defined pipeline delay with respect to the command. Similarly, the information to disable may be contained in the opcode of a command, in which it may be decoded anywhere in the pipeline for ultimate supply to the disable input of a write port of register file 14. In yet another embodiment the information to control disabling may be supplied from an operand register. In this embodiment, data from an addressed operand register is passed along the pipeline stages to register file 14 to control disabling.

Although only a single result register 126 has been shown for each execution unit it will be appreciated that the invention is not limited to such a single register.

FIG. 3 shows part of a processor with a plurality of result registers 32. Two operand inputs are shown for execution unit 12. The result output of execution unit 12 is coupled to a result register 128 in parallel to a number of further result registers 32. Result register 128 is coupled to circuitry further down the pipe-line (not shown). A register select unit 30 has an input coupled to a first stage result register address register 124 and select outputs coupled to select inputs of further result registers 32. The outputs of further result registers 128 are coupled to inputs of an operand selection unit 34, which in turn has outputs coupled to multiplexers 123.

In operation the processor stores selected results in selected ones of the further registers 32. First stage result register address register 120 receives the result register address and the disable information for disabling writing to register file 14. Register select unit 30 is enabled when the disable information indicates that writing to register file 14 will be disabled. In this case, register select unit 30 uses part of the result register address to select one of the further result registers 32. The result from execution unit 12 is written into the selected further result register 32. Subsequently, when an operand address is received that indicates that a result from a further result register 32 should be used as operand, bypass control unit 16 signals operand selection unit 34 to select the output of one of further result registers 32 on the basis of the operand address. The result is then passed to execution unit 12 as operand from operand selection unit 34 via multiplexer 123.

It should be appreciated that the number of further result registers 32 is much smaller than the number of registers in register file 14. This makes it possible to include these further result registers 32 at the end of the pipe-line stage that contains execution unit 12 without a large time penalty. Thus, a limited number of results can be stored at an earlier pipeline stage than the pipeline stage in which results are normally stored in register file 14. These results can be made available as operands from further result registers 32 well before they could have been made available from register file 14.

It should also be appreciated that FIG. 3 merely illustrates an example of how further result registers 32 may be used. Many alternatives are possible. For example, further result registers 32 might be included in a subsequent pipeline stage, i.e. following result register 128, or in more than one pipeline stage. The former may be the case for example when inclusion of the further result registers at the executions stage would require an extension of the duration of the instruction cycle. When different execution units 12 are used in parallel, different sets of further result registers 32 may even be included at different pipeline stages. As another example, selection of the result registers 32 might be implemented differently. For example, a dedicated address part might be included in instructions to select a further result register, or on the contrary register address values that do not address physical registers in register file 14 might be used to select further registers 32. As another example a mode register might be used to select between using and not using further result registers 32. Also selection information may be part of the opcode of commands, instead of coming from the result register address field.

Similarly, various solutions are possible for determining when a result from a further result register 32 should be used instead of data from register file 14. In one embodiment operand addresses contain a special indication to indicate that a result from a further result register 32 should be used.

FIG. 4 shows an alternative embodiment wherein address matching is used. For each further result register 32 a respective register address register 40 is provided that stores the result register address for the result stored in further result register 32. Bypass control unit compares operand register addresses with the result register addresses from register address registers. When a match occurs bypass control unit 16 signals operand selection unit 34 and multiplexers 123 (shown in FIG. 3) to substitute a result from further result registers 32 for operand data from register file 14. Preferably, bypass control unit 16 also compares result register addresses from the pipeline register 124 with stored result register addresses from register address register 40 and resets a register address registers 40 when it contains the register address of specified in a command. Thus it is ensured that a result from register file 14 will be used subsequently for that register address (unless of course a new result is stored in further result registers 32 subsequently). It will be appreciated that further result registers 32 with register address registers 40 form an embodiment of a simple associative memory. Other types of associative memories may be used as an alternative.

Although it has been assumed in the preceding that the instructions contain information to indicate which of the further result registers 32 should be used to store a particular result, it should be appreciated that instead it may suffice to indicate merely that the particular result and its result register address should be stored in one of the further result registers 32 and its corresponding further result register address register 40, and optionally for how many instruction cycles the result should be stored, or how many times it will be read. In this case, an automatic register assignment unit may be provided to assign the result to any free one of the further result registers 32 (a further register may be recorded as free after a predetermined number of instruction cycles (or the optionally programmed number) has passed, or after the result has been read (or read the programmed number of times)). Although useful, further result register address register 40 is not strictly necessary for this: at compile time it is possible to predict which further result register 32 will be used and a selection address for that further result register 32 may be included in the operand specification.

Although only one execution unit 12 was shown in FIGS. 3 and 4 for the sake of clarity, it will be understood that in practice a plurality of execution units 12 may be used in parallel to execute different commands from an instruction. In this case, each execution unit 12 may be provided with its own set of further result registers 32. Bypass control unit 16 controls whether and from which set results are substituted for operand data from register file 14. As an alternative, a shared set of further result registers 32 may be used. In this case the instructions should contain information to indicate which, if any, of the execution units 12 should write to which further result register 32 (and, if necessary to its corresponding result register address register 40).

It will be appreciated that writing into further result registers can make it superfluous to write into register file 14. By including information in the instructions to selectively write results into further result registers 32 and to disable writing of a result into register file 14 overall power consumption can be reduced. Of course, writing into further result registers also consumes power, but because the number of these further results registers 32 is smaller than that in register file 14 less power is consumed. The size of register file 14 can therefore be extended without a severe power consumption penalty. As shown in FIG. 3, the same signal is used to signal disabling of writing into register file 14 and to enable writing into further result registers 32. This helps to reduce instruction size. As a result, results are written either in further result registers 32 or in register file 14. However, it is also possible to used independently settable control information for disabling writing into register file 14 and for selecting further result registers 32. Thus, under program control a bypass of a result from further result registers can be selectively combined with either or not longer term storing in register file 14, as needed for a particular program.

FIG. 5 shows part of another embodiment of a processor. Compared to the embodiment of FIG. 1 in the embodiment of FIG. 5 a number of further result register address registers 50 and further result registers 52 have been added downstream from result register address registers 126 and result registers 128. Further result register address registers 50 and further result registers 52 have outputs coupled to bypass control unit 16. In operation results of execution of commands and result register addresses of these results are passed down the pipeline, even after they the instruction cycle from which they could be retrieved from register file 14 if writing is enabled. Bypass control unit 16 controls whether results from further result register address registers 50 and further result registers 52 are used or from register file 14. This may be done on the basis of register operand/result address comparison or using explicit information from the instruction. Use of further result register address registers 50 and further result registers 52 makes it possible to disable writing of a result into register file 14 when that result is needed only within a predetermined number of instruction cycles after it has been generated. When this is the case, information is added to the instructions to disable writing of the result into register file 14. Thus, power consumption for writing into register file 14 can be saved.

In an embodiment storing of a register address and a result in further result register address registers 50 and further result registers 52 is disabled if the result is stored in register file 14. Thus, power is saved when storing in register file 14 is not disabled. In this embodiment additional registers for disable information are included in parallel with further result register address registers 50. The disable information is coupled to further result register address registers 50 and further result registers 52. The disable information is used to disable updating of the content of further result register address registers 50 and further result registers 52 when the disable information indicates that writing of the result into register file 14 has not been disabled. In this case, the disable information may also be used to indicate to bypass control unit that the operand data should be retrieved from register file 14 instead of further result register address registers 50 and further result registers 52.

It will be understood that any number of one or more further result register address registers 50 and further result registers 52, not only two, may be included in series, permitting results to be bypassed as operands. It will also be understood that additional result register address registers 50 and result registers 52 may be present in the pipeline between the result register address register 126 and the result registers 128 that follow execution unit 12 on one hand and further result register address registers 50 and further result registers 52 on the other hand when there are additional pipeline stages behind execution unit. Bypass control unit 16 uses results from these stages for bypass as well.

The invention claimed is:

1. An instruction processing device comprising:
   an instruction issue unit for issuing successive instructions;
   a plurality of pipe-line stages coupled to the instruction issue unit, at least one of the pipe-line stages comprising a functional unit for executing a command from the instructions;
   a first register unit including a plurality of registers coupled to the functional unit for storing a result of execution of the command when the command has reached a first one of the pipeline stages, and for supplying bypass operand data, through a selector, to a circuit in a pipe-line stage preceding the first one of the pipeline stages;
   a second register unit, coupled to the functional unit for storing the result when the command has reached a second one of the pipeline stages, downstream from the first one of the pipeline stages, and for supplying operand data to the functional unit;
   a disable circuit coupled to selectively disable storing of results in the second register unit under control of the instructions, wherein the result is passed to the functional unit via a bypass path before the storing of the result in the second register unit;
   a multiplexer having inputs connected to an output of the selector and a read port of the second register unit; and
   a bypass control unit arranged to compare a result register address for the result from a first one of the commands with an operand register address from a second one of the commands that follows the first one of the commands directly or indirectly, and to substitute a result from a selected register of the plurality of registers of the first register unit that contains the result for an operand from the second register unit in case of a match of the addresses;
   wherein the bypass control unit is further arranged to control the selector and the multiplexer to select the result from the selected register for feeding back the result to the functional unit through the selector and the multiplexer.

2. The instruction processing device according to claim 1, wherein the second register unit comprise a plurality of registers, and wherein the first register unit contains fewer registers than the second register unit.

3. The instruction processing device according to claim 1, further comprising a plurality of functional units, arranged to execute respective commands from an instruction in parallel, the second register unit having a plurality of write ports for writing the result from respective ones of the functional unit, the disable circuit being arranged to disable writing at selected write ports, selected under control of the instructions.

4. The instruction processing device according to claim 1, wherein the first register unit comprises a chain of registers for supplying bypass operand data, arranged as a shift register with an input coupled to a result output of the first one of the stages and operative to shift the result through successive shift register stages in successive instruction cycles, at least if storing of the result in the second register unit is disabled, the chain extending further than necessary for writing the result into the second register unit.

5. The instruction processing device according to claim 4, wherein the registers in the chain are addressable from the commands.

6. The instruction processing device of claim 1, wherein the disable circuit is arranged to suppress a supply of clock signals to circuitry for writing the result into a register of the second register unit from a write port of the second register unit.

7. A method of executing a program of instructions in an instruction processor, the method comprising the acts of:
   pipelining execution of commands from the instructions;
   storing results of the commands in a first register unit including a plurality of registers;
   passing results of executions by an execution unit back to the execution unit via a bypass path before storing of the results in a register file, wherein the bypass path includes a selector for selectively connecting a result of a selected register of the plurality of registers back to the execution unit through a multiplexer;
   selectively using the result from the selected register bypassed from a pipelining stage as a bypassed operand instead of at least one of operands from the register file;
   controlling the selector and the multiplexer to select the result from the selected register for feeding back the result to the functional unit through the selector and the multiplexer while selectively suppressing, under program control, writing of the first one of the results to the register file.

8. The method according to claim 7, comprising writing the result from the selected register into an addressable one of a plurality of bypass registers that are located to receive the result earlier during pipelining than the register file.

9. A computer readable medium embodying a computer program product comprising instructions for an instruction processor for implementing the method according to claim 7.

10. A method of compiling a program of instructions for an instruction processor, the method comprising the acts of:
    generating a series of instructions;
    first detecting for a result to be produced by a first one of the instructions which second one of the instructions use the result as operand;
    second detecting whether it can be guaranteed that it will be possible to bypass the result in the instruction processor as operand for all second ones of the instructions without retrieving the result from a register file;
    before storing of the result in the register file, passing the result to an execution unit, for executing a command from the instructions through a selector and a multiplexer;
    generating information in the instruction to disable writing to the register file when it can be guaranteed that it will be possible to bypass the result as operand in the instruction processor for all second ones of the instructions while controlling the selector and the multiplexer to pass the result to the execution unit.

11. The method of compiling according to claim 10, comprising including an indication in the instructions that the result should be stored in one of a plurality of bypass registers that is addressable on writing and/or reading of the result to the plurality of bypass registers.

12. A computer readable medium embodying a computer program product comprising instructions for an instruction processor for implementing the method according to claim 10.

* * * * *